United States Patent
Bartkowiak (10) Patent No.: US 11,447,878 B2
(45) Date of Patent: Sep. 20, 2022

(54) HYDROGEN GENERATING CELL

(71) Applicant: James Bartkowiak, York, PA (US)

(72) Inventor: James Bartkowiak, York, PA (US)

( * ) Notice: Subject to any disclaimer, the term of this patent is extended or adjusted under 35 U.S.C. 154(b) by 259 days.

(21) Appl. No.: 16/299,689

(22) Filed: Mar. 12, 2019

(65) Prior Publication Data
US 2019/0284707 A1    Sep. 19, 2019

Related U.S. Application Data

(60) Provisional application No. 62/761,146, filed on Mar. 13, 2018.

(51) Int. Cl.
| | |
|---|---|
| *C25B 1/04* | (2021.01) |
| *C25B 15/00* | (2006.01) |
| *B01J 19/12* | (2006.01) |
| *C25B 9/19* | (2021.01) |
| *C25B 9/73* | (2021.01) |
| *C25B 1/55* | (2021.01) |

(52) U.S. Cl.
CPC .............. *C25B 1/04* (2013.01); *B01J 19/121* (2013.01); *B01J 19/123* (2013.01); *C25B 1/55* (2021.01); *C25B 9/19* (2021.01); *C25B 9/73* (2021.01); *C25B 15/00* (2013.01)

(58) Field of Classification Search
CPC ........... C25B 1/10; C25B 1/003; C25B 15/00; C25B 9/08; C25B 1/04; C25B 1/55; C25B 9/19; C25B 9/73; B01J 19/121; B01J 19/123; Y02E 60/36; Y02P 20/133
USPC ........................................................ 205/340
See application file for complete search history.

(56) References Cited

U.S. PATENT DOCUMENTS

| | | | |
|---|---|---|---|
| 4,093,527 A | 6/1978 | Tanno et al. | |
| 4,107,008 A * | 8/1978 | Horvath | C25B 1/04 205/628 |
| 4,279,710 A * | 7/1981 | Coughlin | C25C 1/12 205/343 |
| 4,957,610 A * | 9/1990 | Hawkins | C25B 1/003 204/157.41 |
| 5,330,857 A * | 7/1994 | Sederquist | C01B 21/0405 205/343 |
| 6,063,258 A | 5/2000 | Sayama et al. | |
| 6,669,827 B2 * | 12/2003 | Austin | C01B 3/045 204/270 |
| 7,906,006 B2 | 3/2011 | Irvine et al. | |

(Continued)

OTHER PUBLICATIONS

"Refraction," Britannica Academic, Encyclopedia Britannica, Apr. 9, 2020. academic.eb.com/levels/collegiate/article/refraction/63033. Accessed Nov. 12, 2020 (Year: 2020).*

(Continued)

*Primary Examiner* — Harry D Wilkins, III
(74) *Attorney, Agent, or Firm* — The Webb Law Firm (57) ABSTRACT

A hydrogen generating fuel cell includes an anode and a cathode separated by a channel configured to hold liquid water or water vapor. At least one of the anode and the cathode are porous. The hydrogen generating fuel cell includes a power source electrically connected to the anode and the cathode and an ultraviolet radiation source positioned to emit ultraviolet radiation from the anode to the cathode, the cathode to the anode, or both directions. A hydrogen generating system and a method of generating hydrogen are also disclosed.

21 Claims, 9 Drawing Sheets

(56) References Cited

U.S. PATENT DOCUMENTS

| | | | |
|---|---|---|---|
| 7,938,939 B2 | 5/2011 | Lee et al. | |
| 8,075,746 B2* | 12/2011 | Hartvigsen | C25B 1/00 |
| | | | 204/242 |
| 8,262,896 B2 | 9/2012 | Irvine et al. | |
| 8,282,812 B2 | 10/2012 | Burtch | |
| 8,608,936 B2 | 12/2013 | Skomsvold | |
| 8,658,008 B2 | 2/2014 | Takeuchi et al. | |
| 8,986,531 B2* | 3/2015 | Eckelberry | C25B 1/003 |
| | | | 205/340 |
| 9,123,925 B2 | 9/2015 | Smith, Jr. | |
| 9,133,048 B2 | 9/2015 | Ishihara et al. | |
| 9,180,424 B2 | 11/2015 | Wey | |
| 9,391,334 B2 | 7/2016 | Barton | |
| 9,611,553 B2 | 4/2017 | Pavlovic et al. | |
| 9,617,177 B2 | 4/2017 | Kolstad | |
| 9,630,863 B2 | 4/2017 | McClean | |
| 9,708,718 B2 | 7/2017 | Yoshida et al. | |
| 9,790,108 B2 | 10/2017 | Foret | |
| 9,803,290 B2 | 10/2017 | Bertier | |
| 9,850,148 B2 | 12/2017 | Kolstad et al. | |
| 9,856,152 B2 | 1/2018 | Bokermann et al. | |
| 9,868,653 B2 | 1/2018 | Denvir et al. | |
| 9,884,773 B2 | 2/2018 | O'Donnell | |
| 9,938,165 B2 | 4/2018 | Taghipour | |
| 9,957,626 B2 | 5/2018 | Kawajiri et al. | |
| 9,963,794 B2 | 5/2018 | Iwai et al. | |
| 9,994,450 B2 | 6/2018 | Coyle et al. | |
| 2003/0098232 A1 | 5/2003 | Roe et al. | |
| 2004/0040838 A1 | 3/2004 | Helmke et al. | |
| 2004/0247522 A1* | 12/2004 | Mills | C23C 16/27 |
| | | | 423/648.1 |
| 2005/0074657 A1 | 4/2005 | Rusta-Sallehy et al. | |
| 2005/0178670 A1* | 8/2005 | Austin | C25B 1/55 |
| | | | 205/629 |
| 2005/0205128 A1* | 9/2005 | Deng | C25B 1/003 |
| | | | 136/256 |
| 2006/0060464 A1* | 3/2006 | Chang | H05H 1/46 |
| | | | 422/186 |
| 2006/0228606 A1 | 10/2006 | Fiebig et al. | |
| 2007/0292735 A1* | 12/2007 | McMahon | H01M 4/86 |
| | | | 429/431 |
| 2009/0008261 A1* | 1/2009 | Kotzeva | C25B 9/08 |
| | | | 205/349 |
| 2009/0026070 A1* | 1/2009 | Fan | C25B 1/003 |
| | | | 204/242 |
| 2009/0127124 A1* | 5/2009 | Guerra | C25B 1/55 |
| | | | 205/340 |
| 2009/0159461 A1 | 6/2009 | McCutchen et al. | |
| 2010/0005809 A1 | 1/2010 | Anderson | |
| 2010/0133110 A1* | 6/2010 | Nocera | C25B 1/55 |
| | | | 205/340 |
| 2012/0168318 A1* | 7/2012 | Ueno | C25B 1/003 |
| | | | 205/340 |
| 2013/0068296 A1* | 3/2013 | Yoshida | C25B 1/003 |
| | | | 136/256 |
| 2013/0180862 A1* | 7/2013 | Yoshida | C25B 1/003 |
| | | | 205/340 |
| 2013/0252121 A1 | 9/2013 | Oppenheim | |
| 2015/0004510 A1 | 1/2015 | Bertier | |
| 2015/0068915 A1* | 3/2015 | Hoch | C25B 1/55 |
| | | | 205/340 |
| 2015/0274558 A1 | 10/2015 | McClean | |
| 2016/0040303 A1* | 2/2016 | Gershon | C25B 1/003 |
| | | | 205/340 |
| 2016/0137529 A1 | 5/2016 | Cho et al. | |
| 2016/0230292 A1 | 8/2016 | Lorge | |
| 2017/0144901 A1 | 5/2017 | McClean | |
| 2017/0301970 A1 | 10/2017 | Antequera Rodriguez et al. | |
| 2017/0313601 A1 | 11/2017 | Westerhoff et al. | |

OTHER PUBLICATIONS

Daimon et al, "Measurement of the refractive index of distilled water rom the near-infrared region to the ultraviolet region," Applied Optics vol. 46, No. 18, pp. 3811-3820, Jun. 20, 2007 (Year: 2007).*

Sokolov et al, Photolysis of Liquid Water at 1849 Å, The Journal of Chemical Physics, vol. 44, Issue 9, Dec. 1965, pp. 3329-3337 (Year: 1965).*

Wang et al, Two-photon dissociation of water: A new OH source for spectroscopic studies, The Journal of Chemical Physics, vol. 62, Issue 1, Jan. 1975, pp. 53-55 (Year: 1975).*

Marsalek et al, Chasing charge localization and chemical reactivity following photoionization in liquid water, The Journal of Chemical Physics, vol. 135, Issue 22, Dec. 2011, pp. 224510-1 to 224510-14 (Year: 2011).*

Yalin et al, Laser Plasma Formation Assisted by Ultraviolet Pre-Ionization, Physics of Plasmas, vol. 21, No. 10, Oct. 2014, pp. 1-16 (Year: 2014).*

Tian et al, Laser Focusing Geometry Effects on Laser-Induced Plasma and Laser-Induced Breakdown Spectroscopy in Bulk Water, Journal of Analytical Atomic Spectrometry, vol. 34, No. 1, Nov. 2018, pp. 118-126 (Year: 2018).*

* cited by examiner

HYDROGEN GENERATING CELL

CROSS REFERENCE TO RELATED APPLICATIONS

This application claims the benefit of U.S. Provisional Application No. 62/761,146, filed Mar. 13, 2018, the disclosure of which is hereby incorporated in its entirety by reference.

BACKGROUND

Field

The present disclosure relates to a hydrogen generating fuel cell, a hydrogen generating system, and a method of generating hydrogen.

Description of Related Art

Hydrogen has increasingly become an important source of energy that is pollution free when generated from water. It is a fuel source commonly used to power fuel cells and used for energy storage. Hydrogen is also a desirable fuel source because it is the most abundant element in the universe and is present in myriad compounds, such as water and many living things. Although abundant, hydrogen is not commonly found in its elemental form because it combines with other elements to make the common compounds.

SUMMARY

The present disclosure is directed to a hydrogen generating fuel cell including: an anode and a cathode separated by a channel configured to hold liquid water or water vapor, where at least one of the anode and the cathode are porous; a power source electrically connected to the anode and the cathode; and an ultraviolet radiation source positioned to emit ultraviolet radiation from the anode to the cathode, the cathode to the anode, or both directions.

The ultraviolet radiation source may be positioned to emit ultraviolet radiation from the anode to the cathode. The hydrogen generating fuel cell may include a splitting medium positioned so as to split the emitted ultraviolet radiation into a plurality of rays. The liquid water or the water vapor may include one of the group of fresh water, salt water, and wastewater. The hydrogen generating fuel cell may further include a first gas chamber positioned adjacent to and in fluid communication with the anode and configured to collect oxygen gas ionized by the emitted ultraviolet radiation and a second gas chamber positioned adjacent to and in fluid communication with the cathode and configured to collect hydrogen gas ionized by the emitted ultraviolet radiation. The anode or the cathode may be a catalyst. The anode or the cathode may include a membrane configured to allow oxygen gas and/or hydrogen gas ionized by the emitted ultraviolet radiation to pass therethrough while preventing the liquid water or the water vapor from passing therethrough. The ultraviolet radiation source may include an ultraviolet laser or a high intensity ultraviolet radiation source. The anode and the cathode may be cylinders comprising vanes to define the channel as a spiral passage for the liquid water or the water vapor. The heat source, the power source, and/or a second power source to power the ultraviolet radiation source may be powered by a renewable energy source The present disclosure is also directed to a hydrogen generating system including: a hydrogen generating fuel cell including: an anode and a cathode separated by a channel configured to hold liquid water or water vapor, where at least one of the anode and the cathode are porous; a power source electrically connected to the anode and the cathode; and an ultraviolet radiation source positioned to emit ultraviolet radiation from the anode to the cathode, the cathode to the anode, or both directions.

The hydrogen generating system may further include a turbine in fluid communication with the channel such that non-ionized liquid water or water vapor leaving the channel is configured to operate the turbine. The hydrogen generating system may further include a tank in fluid communication with the channel such that non-ionized liquid water or water vapor leaving the channel is stored in the tank. The hydrogen generating system may further include a tank in fluid communication with the anode such that gaseous oxygen passing through the anode is stored in the tank. The hydrogen generating system may further include a tank in fluid communication with the cathode such that gaseous hydrogen passing through the cathode is stored in the tank. The hydrogen generating system may further include a plurality of the hydrogen generating fuel cells in a stacked arrangement to form a fuel cell stack.

The present disclosure is also directed to a method of generating hydrogen including: providing a hydrogen generating fuel cell including: an anode and a cathode separated by a channel configured to hold liquid water or water vapor, where at least one of the anode and the cathode are porous; a power source electrically connected to the anode and the cathode; and an ultraviolet radiation source positioned to emit ultraviolet radiation from the anode to the cathode, the cathode to the anode, or both directions; and emitting the ultraviolet radiation from the anode to the cathode, the cathode to the anode, or both directions.

The method may further include collecting hydrogen gas ionized by the ultraviolet radiation and passing through the cathode. The method may further include collecting oxygen gas ionized by the ultraviolet radiation and passing through the anode. The method may further include collecting non-ionized liquid water or water vapor leaving the channel.

Further embodiments are set forth in the following numbered clauses:

Clause 1: A hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions.

Clause 2: The hydrogen generating fuel cell of clause 1, wherein the ultraviolet radiation source is positioned to emit ultraviolet radiation from the anode to the cathode.

Clause 3: The hydrogen generating fuel cell of clause 1 or 2, further comprising a splitting medium positioned so as to split the emitted ultraviolet radiation into a plurality of rays.

Clause 4: The hydrogen generating fuel cell of any of clauses 1-3, wherein the liquid water or the water vapor comprises one of the group of fresh water, salt water, and wastewater.

Clause 5: The hydrogen generating fuel cell of any of clauses 1-4, further comprising: a first gas chamber positioned adjacent to and in fluid communication with the anode and configured to collect oxygen gas ionized by the emitted ultraviolet radiation; and a second gas chamber positioned adjacent to and in fluid communication with the cathode and configured to collect hydrogen gas ionized by the emitted ultraviolet radiation.

Clause 6: The hydrogen generating fuel cell of any of clauses 1-5, wherein the anode or the cathode is a catalyst.

Clause 7: The hydrogen generating fuel cell of any of clauses 1-6, wherein the anode or the cathode further comprises a membrane configured to allow oxygen gas and/or hydrogen gas ionized by the emitted ultraviolet radiation to pass therethrough while preventing the liquid water or the water vapor from passing therethrough.

Clause 8: The hydrogen generating fuel cell of any of clauses 1-7, wherein the ultraviolet radiation source comprises an ultraviolet laser or a high intensity ultraviolet radiation source.

Clause 9: The hydrogen generating fuel cell of any of clauses 1-8, wherein the anode and the cathode are cylinders comprising vanes to define the channel as a spiral passage for the liquid water or the water vapor.

Clause 10: The hydrogen generating fuel cell of any of clauses 1-9, wherein the heat source, the power source, and/or a second power source to power the ultraviolet radiation source is powered by a renewable energy source.

Clause 11: The hydrogen generating fuel cell of any of clauses 1-10, further comprising a water source in fluid communication with the channel.

Clause 12: The hydrogen generating fuel cell of any of clauses 1-11, further comprising a heat source for heating the liquid water or the water vapor.

Clause 13: The hydrogen generating fuel cell of any of clauses 10-12, wherein the heat source is powered by renewable thermal energy.

Clause 14: The hydrogen generating fuel cell of clause 12, wherein the heat source is a fossil fuel or a nuclear power source.

Clause 15: The hydrogen generating fuel cell of any of clauses 1-14, further comprising a plurality of ultraviolet radiation sources.

Clause 16: The hydrogen generating fuel cell of any of clauses 1-15, wherein a pressure in the channel is from 0 psi to 1000 psi.

Clause 17: The hydrogen generating fuel cell of any of clauses 1-16, wherein the ultraviolet radiation source comprises an ultraviolet radiation emitting ultraviolet radiation having a wavelength from 126 nm to 193 nm.

Clause 18: The hydrogen generating fuel cell of any of clauses 1-17, wherein the power source is a direct current power source.

Clause 19: A hydrogen generating system comprising: a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions.

Clause 20: The hydrogen generating system of clause 19, further comprising: a turbine in fluid communication with the channel such that non-ionized liquid water or water vapor leaving the channel is configured to operate the turbine.

Clause 21: The hydrogen generating system of clause 19 or 20, further comprising: a tank in fluid communication with the channel such that non-ionized liquid water or water vapor leaving the channel is stored in the tank.

Clause 22: The hydrogen generating system of any of clauses 19-21, further comprising: a tank in fluid communication with the anode such that gaseous oxygen passing through the anode is stored in the tank.

Clause 23: The hydrogen generating system of any of clauses 19-22, further comprising: a tank in fluid communication with the cathode such that gaseous hydrogen passing through the cathode is stored in the tank.

Clause 24: The hydrogen generating system of any of clauses 19-23, further comprising a plurality of the hydrogen generating fuel cells in a stacked arrangement to form a fuel cell stack.

Clause 25: A method of generating hydrogen comprising: providing a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions; and emitting the ultraviolet radiation from the anode to the cathode, the cathode to the anode, or both directions.

Clause 26: The method of clause 25, further comprising: collecting hydrogen gas ionized by the ultraviolet radiation and passing through the cathode.

Clause 27: The method of clause 25 or 26, further comprising: collecting oxygen gas ionized by the ultraviolet radiation and passing through the anode.

Clause 28: The method of any of clauses 25-27, further comprising: collecting non-ionized liquid water or water vapor leaving the channel.

Clause 29: A method of collecting hydrogen gas from water comprising: providing a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions; emitting the ultraviolet radiation from the anode to the cathode, the cathode to the anode, or both directions; and collecting hydrogen gas ionized by the ultraviolet radiation and passing through the cathode.

Clause 30: A method of collecting oxygen gas from water comprising: providing a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions; emitting the ultraviolet radiation from the anode to the cathode, the cathode to the anode, or both directions; and collecting oxygen gas ionized by the ultraviolet radiation and passing through the anode.

Clause 31: A method of powering a turbine using water comprising: providing a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions; emitting the ultraviolet radiation from the anode to the cathode, the cathode to the anode, or both directions; flowing non-ionized liquid water or water vapor leaving the channel to a turbine to operate the turbine.

Clause 32: A method desalinating water comprising: providing a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions; emitting the ultraviolet radiation from the anode to the cathode, the cathode to the anode, or both directions; flowing non-ionized liquid water or water vapor leaving the channel to a tank.

Clause 33: A fuel cell stack comprising a plurality of hydrogen generating fuel cells connected in a stacked arrangement wherein at least one of the hydrogen generating fuel cells comprise: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

DETAILED DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

The present disclosure is directed to a hydrogen generating fuel cell comprising: an anode and a cathode separated by a channel configured to hold liquid water or water vapor, wherein at least one of the anode and the cathode are porous; a power source electrically connected to the anode and the cathode; and an ultraviolet radiation source positioned to emit ultraviolet radiation from the anode to the cathode, the cathode to the anode, or both directions.

Figure 1:
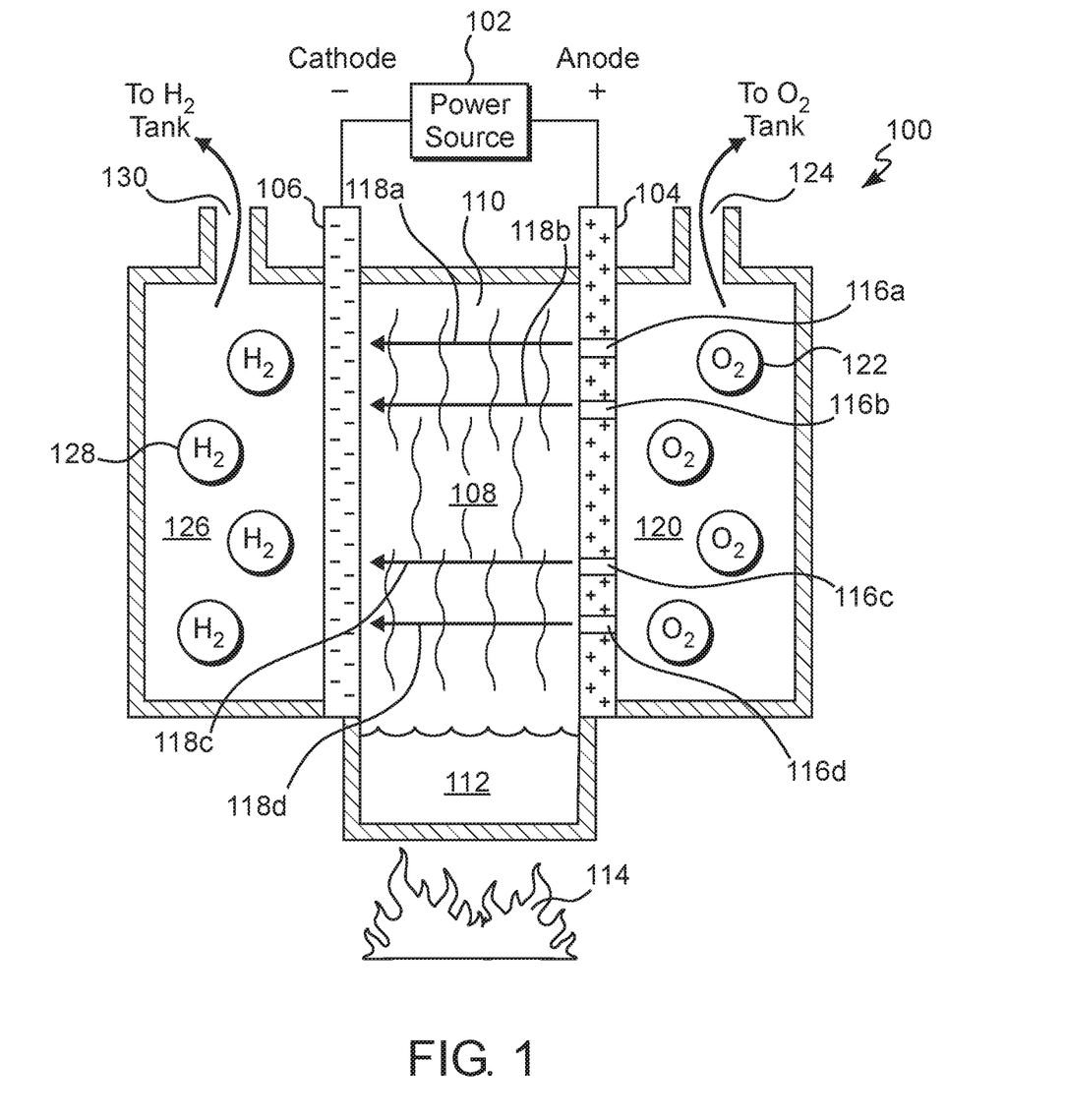
FIG. 1 shows a cross-sectional view of a non-limiting example of a hydrogen generating fuel cell.

Referring to FIG. 1, a non-limiting example of a hydrogen generating fuel cell 100 (hereinafter "fuel cell") is shown. The fuel cell 100 may include a power source 102 electrically connected to an anode 104 and a cathode 106. The anode 104 and the cathode 106 may define a channel 108 therebetween that is configured to hold liquid water or water vapor 110 (hereinafter "water/water vapor"). The water/water vapor 110 as water vapor may have a temperature ranging from 100° F.-1000° F. (37° C.-538° C.). The channel 108 may be any suitable width. The channel 108 may have a fixed width or a variable width. The power source 102 may be any suitable power source, which includes direct current power sources, such as direct current battery sources, power from photovoltaic solar panels, or an alternating current source rectified to direct current from a renewable power source, nuclear power source, or fossil fuel power source. The anode 104 and the cathode 106 are connected to the power source 102 in order to form an electric circuit that is open in the channel 108 between the anode 104 and the cathode 104.

The anode 104 may be positively charged. The anode 104 may be made of any suitable material. Suitable materials include conductive and/or inert metals, such as stainless steel, tin, titanium, or gold. The anode 104 may be made of a catalyst material suitable for helping the reaction of splitting the water/water vapor 110 into its ions, such as the catalyst including platinum or another platinum group metal. The anode 104 may be porous, and the pores of the anode 104 may be sufficiently large to allow oxygen gas to pass therethrough (e.g., at least 80 to 160 picometers given the atomic diameter of oxygen). The anode 104 may include a proton exchange membrane (PEM).

The cathode 106 may be negatively charged. The cathode 106 may be made of any suitable material. Suitable materials include conductive and/or inert metals, such as stainless steel, tin, titanium, or gold. The cathode 106 may be made of a catalyst material suitable for helping the reaction of splitting the water/water vapor 110 into its ions, such as the catalyst including platinum or another platinum group metal. The cathode 106 may be porous, and the pores of the cathode 106 may be sufficiently large to allow hydrogen gas to pass therethrough (e.g., at least 50 to 120 picometers given the atomic diameter of hydrogen). The cathode 106 may include a proton exchange membrane (PEM).

The anode 104 and the cathode 106 may be sealed at the top and the bottom of the fuel cell 100, shown in FIG. 1.

The fuel cell 100 may further include a reservoir 112 containing liquid water. This liquid water may be vaporized by a heat source 114 to allow the water/water vapor 110 (e.g., the water vapor in this example) to rise or otherwise flow into the channel 108. The pressure in the channel 108 may range from 0 psi to 1000 psi. The liquid water in the reservoir 112 may include fresh water, salt water, or wastewater. The heat source 114 may be powered by renewable energy sources, such as solar thermal power utilizing molten salt or geothermal energy. Electrical power may be used to create the thermal energy of the heat source 114. In such cases, the electrical power for the heat source 114 may be generated from renewable sources, such as photovoltaic solar, hydropower, or wind power. The heat source 114 can include burning a fuel source, such as coal, natural gas, or wood. The heat source 114 may include an electric coil. The heat source 114 may be a fossil fuel power source or a nuclear power source. The heat source 114 may be positioned within the reservoir 112 itself or be positioned outside the reservoir 112. The reservoir 112 may be an isolated container of the liquid water or may be in fluid communication with a water source to continuously supply additional water to the reservoir 112.

With continued reference to FIG. 1, the hydrogen generating fuel cell 100 may include at least one ultraviolet radiation source 116a-116d. The ultraviolet radiation source 116a-116d may be an ultraviolet laser or a high intensity ultraviolet radiation source. The ultraviolet radiation source 116a-116d may emit the ultraviolet radiation in a continuous or pulsed operation. The ultraviolet laser may be an excimer laser to emit ultraviolet radiation 118a-118d having a high energy, low wavelength, such as a wavelength in the range of 126 nm to 193 nm. The ultraviolet radiation source 116a-116d may be a concentrated ultraviolet radiation source (e.g., the ultraviolet laser). The ultraviolet radiation source 116a-116d may include a system including an ultraviolet lamp in combination with a mirror or lens to intensify or concentrate the ultraviolet radiation. As shown in FIG. 1, a plurality of ultraviolet radiation sources 116a-116d may be used; however, other embodiments may include a single ultraviolet radiation source. The ultraviolet radiation sources 116a-116d may emit the ultraviolet radiation 118a-118d proximate the anode 104 and/or the cathode 106, and the emitted radiation 118a-118d may be emitted from the anode 104 to the cathode (or vice versa or in both directions). As shown in FIG. 1, the ultraviolet radiation sources 116a-116d may emit the ultraviolet radiation 118a-118d from the anode 104 to the cathode 106; however, the ultraviolet radiation sources 116a-116d may emit the ultraviolet radiation 118a-118d from the cathode 106 to the anode 104, or some combination thereof. The ultraviolet radiation sources 116a-116d may emit the ultraviolet radiation 118a-118d to form an ionized line or plane between and connecting the two electrodes (anode 104 and cathode 106) to complete the circuit. The ultraviolet radiation 118a-118d concentrates and creates a low temperature plasma field in combination with the electrical energy, allowing the system to run at lower temperatures. The ultraviolet radiation sources 116a-116d may be embedded in the anode 104 and/or the cathode 106 (see FIG. 3).

The ultraviolet radiation sources 116a-116d may emit the ultraviolet radiation 118a-118d through the channel 108 from the anode 104 to the cathode 106 (or vice versa or in both directions) while the water/water vapor 110 is flowing through the channel 108. The ultraviolet radiation 118a-118d emitted into the channel 108 may ionize the water/water vapor 110 into positive hydrogen atoms and negative oxygen atoms. These ionized particles may then migrate to the anode 104 (oxygen) and cathode 106 (hydrogen). The pressure in the channel 108 and the electric charge of the respective electrodes (anode 104 and cathode 106) cause these particles to move through the respective electrodes to allow for the collection of oxygen and hydrogen gas. The hydrogen gas may be stored for energy production.

With continued reference to FIG. 1, the fuel cell may further include a first gas 120 chamber positioned adjacent to and in fluid communication with the anode 104 and the channel 108. The pressure in the first gas chamber 120 may range from 0 psi to 1000 psi. The first gas chamber 120 may be configured to collect oxygen gas 122 ionized by the emitted ultraviolet radiation 118a-118d. The oxygen gas 122, upon being ionized from the water/water vapor 110 may migrate through the channel 108 toward the anode 104, such that it passes through the pores of the anode 104 and into the first gas chamber 120. The first gas chamber 120 may include an outlet 124 in fluid communication with an oxygen tank via a system of pipes, valves, and the like, for collecting the recovered oxygen gas. Thus, the oxygen gas 122 may pass through the anode 104, through the first gas chamber 120, and into an oxygen gas tank via the outlet 124.

With continued reference to FIG. 1, the fuel cell may further include a second gas 126 chamber positioned adjacent to and in fluid communication with the cathode 106 and the channel 108. The pressure in the second gas chamber 126 may range from 0 psi to 1000 psi. The second gas chamber 126 may be configured to collect hydrogen gas 128 ionized by the emitted ultraviolet radiation 118a-118d. The hydrogen gas 128, upon being ionized from the water/water vapor 110 may migrate through the channel 108 toward the cathode 106, such that it passes through the pores of the cathode 106 and into the second gas chamber 126. The second gas chamber 126 may include an outlet 130 in fluid communication with a hydrogen tank via a system of pipes, valves, and the like, for collecting the recovered hydrogen gas. Thus, the hydrogen gas 128 may pass through the cathode 106, through the second gas chamber 126, and into a hydrogen gas tank via the outlet 130. Therefore, both oxygen gas and hydrogen gas may be recovered from the splitting of the water molecules of the water/water vapor 110 with the ultraviolet radiation 118a-118d.

Figure 2:
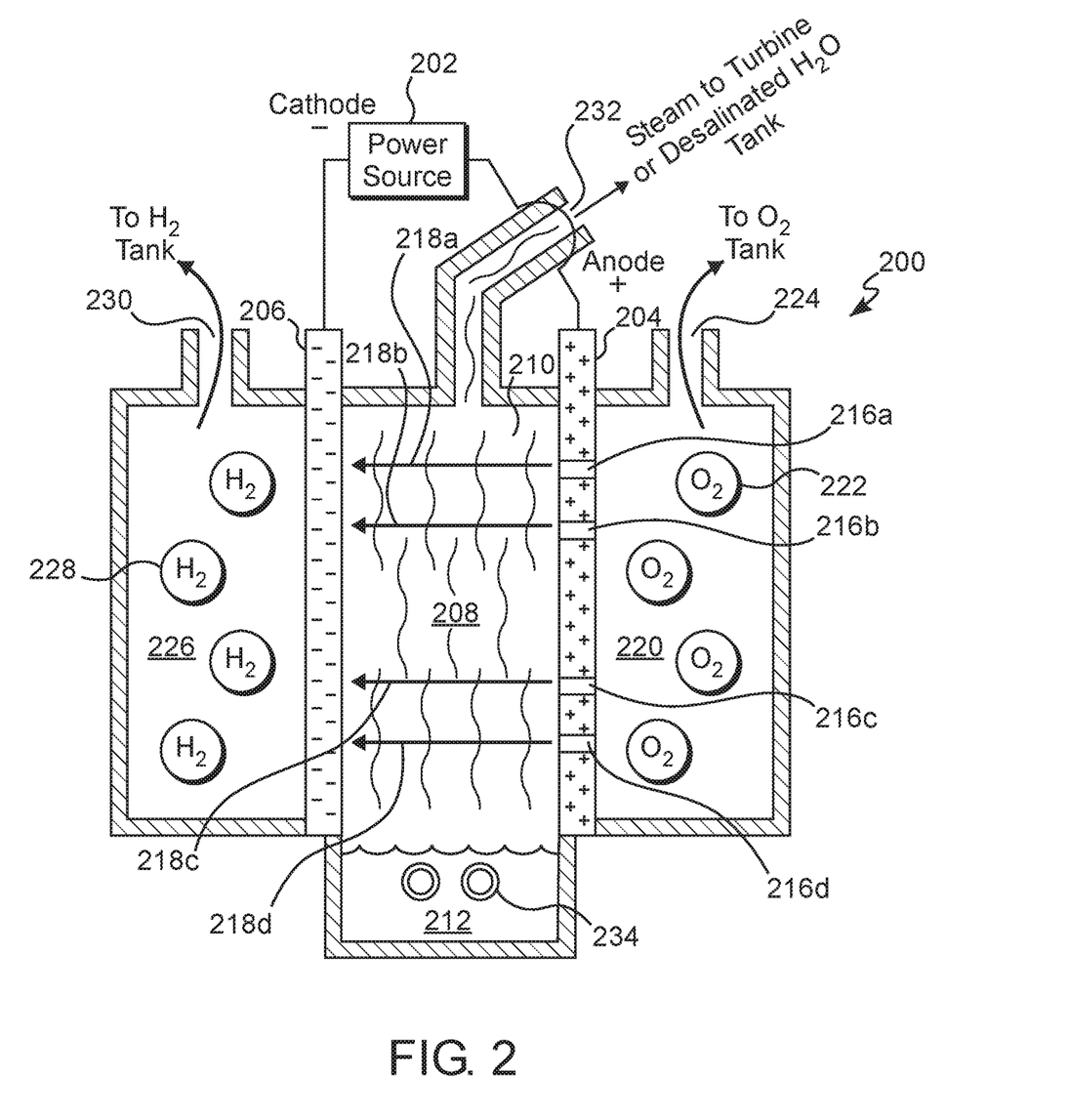
FIG. 2 shows a cross-sectional view of another non-limiting example of a hydrogen generating fuel cell.

Referring to FIG. 2, another non-limiting example of a fuel cell 200 is shown. The fuel cell 200 in FIG. 2 is similar to the one shown and described in FIG. 1, except as hereinafter described. It will be appreciated that elements in the FIGS. include the same features of elements from other FIGS. having the same final two numerals in the element number, except as described herein.

The fuel cell 200 in FIG. 2 further comprises heat exchanger pipes 234 to heat the liquid water in the reservoir 212. The heat exchanger pipes 234 may be used in addition to or instead of the previously described heat source 114. The heat exchanger pipes 234 may be positioned in the reservoir 212. Other arrangements for heating the liquid in the reservoir 212 are within the scope of this disclosure.

Further, the fuel cell 200 in FIG. 2 may include a outlet 232 in fluid communication with the channel 208. Non-ionized water/water vapor exiting the channel 208 may leave via the outlet 232. The non-ionized water/water vapor exiting the channel 208 through the outlet 232 may be flowed to a turbine via a system of pipes, valves, and the like to operate the turbine (e.g., for power generation). The non-ionized water/water vapor exiting the channel 208 through the outlet 232 may be flowed to a desalinated water tank via a system of pipes, valves, and the like, as the non-ionized water/water vapor, in the case of the water being salt water, may have been desalinated by the fuel cell 200. The non-ionized water/water vapor exiting the channel 208 through the outlet 232 may be recirculated back to the reservoir 212 or the channel 208 to continue the ionization of water/water vapor.

Figure 3:
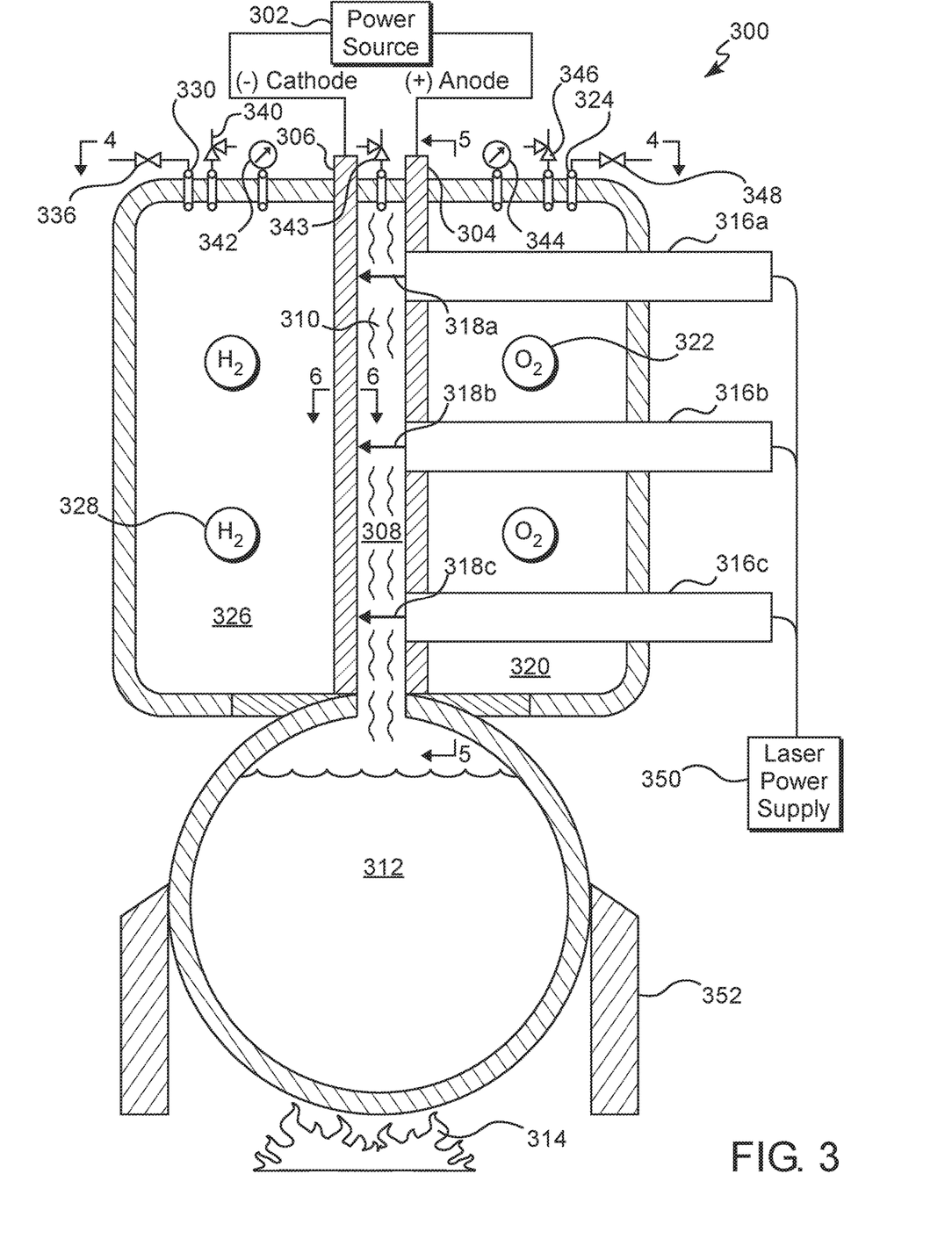
FIG. 3 shows a cross-sectional view of another non-limiting example of a hydrogen generating fuel cell.

Referring to FIG. 3, another non-limiting example of a fuel cell 300 is shown. The fuel cell 300 in FIG. 3 is similar to the one shown and described in FIG. 1, except as hereinafter described. As shown in FIG. 3, the ultraviolet radiation sources 316a-316c may protrude through the first chamber 320 and the anode (304) (or the second chamber 326 and the cathode 306), such that the emitted ultraviolet radiation 318a-318c may be emitted from the anode 304 to the cathode 306 (or the cathode 306 to the anode 304 or in both directions). The anode 304 (or the cathode 306) may define at least one opening for the ultraviolet radiation sources 316a-316c to be set therein, such that the ultraviolet radiation sources 316a-316c are embedded in the anode 304 (or the cathode 306). The ultraviolet radiation sources 316a-316c may be electrically connected to a laser power supply 350, which may be a separate power source from the power source 302 connected to the anode 304 and cathode 306. The laser power supply 350 may be powered by a renewable energy source.

With continued reference to FIG. 3, the reservoir 312 may include a container supported by a stand 352, such that the 312 reservoir is supported over the heat source 314. Any suitable stand arrangement may be included to support the reservoir 312 over the heat source 314.

With continued reference to FIG. 3, the second chamber 326 may include the outlet 330. The outlet 330 may include a valve 336 to open or close the outlet 330 in order to control whether the hydrogen gas 328 can escape from the second chamber 326 or the rate at which hydrogen gas 328 can escape from the second chamber 326. The valve 336 may be any suitable type of valve. The second chamber 326 may further include a pressure relief valve 340 to selectively reduce the pressure in the second chamber 326. The pressure relief valve 340 may be any suitable type of valve. The channel 308 may also include a pressure relief valve 343. The second chamber 342 may further include a pressure gauge 342 to read the pressure in the second chamber 326.

With continued reference to FIG. 3, the first chamber 320 may include the outlet 324. The outlet 324 may include a valve 348 to open or close the outlet 324 in order to control whether the oxygen gas 322 can escape from the first chamber 320 or the rate at which oxygen gas 322 can escape from the first chamber 320. The valve 348 may be any suitable type of valve. The first chamber 320 may further include a pressure relief valve 346 to selectively reduce the pressure in the second chamber 320. The pressure relief valve 346 may be any suitable type of valve. The first chamber 320 may further include a pressure gauge 344 to read the pressure in the first chamber 320.

Figure 4:
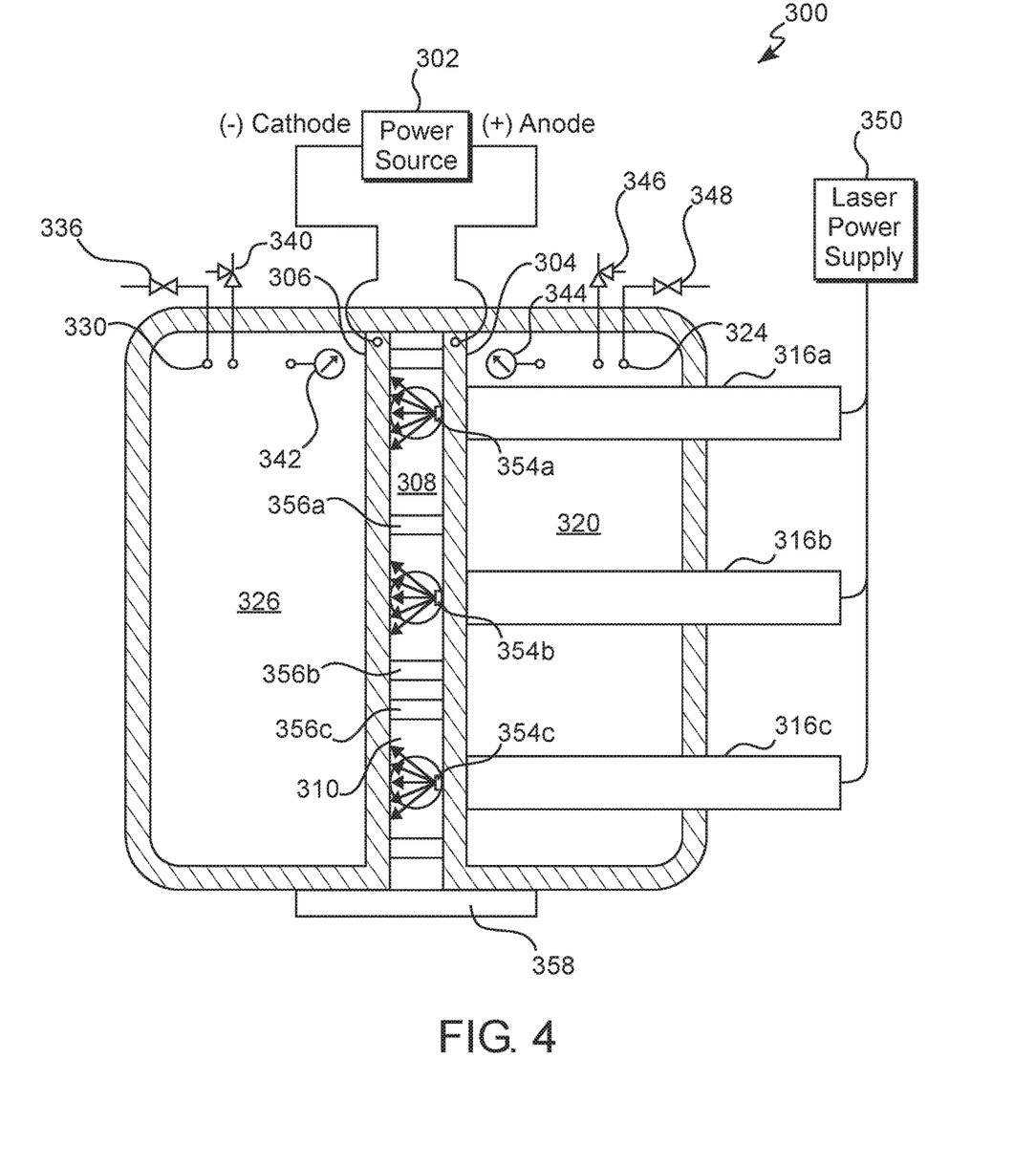
FIG. 4 shows a top view of the hydrogen generating fuel cell of FIG. 3 taken along lines 4-4 thereof.

Referring to FIG. 4, a top view of the fuel cell 300 of FIG. 3 is shown. From this top view, it can be seen that the ultraviolet radiation sources 316a-316c may further include a splitting medium 354a-354c positioned so as to split the emitted ultraviolet radiation into a plurality of rays. The splitting medium 354a-354c may split the emitted ultraviolet radiation along a horizontal plane so that the ultraviolet radiation can be spread in a wider area between the anode 304 and the cathode 306 to more efficiently split the water molecules. The fuel cell 300 may further include spacers 356a-356c to separate the anode 304 from the cathode 306. The spacers 356a-356c may be made of any non-conductive, electrically insulating material. The spacers 356a-356c may fix the distance between the electrodes. The fuel cell 300 may further include a viewing port 358 to allow a user to view the channel 308. The viewing port 385 may be made of a transparent or translucent material, such as glass, polycarbonate, and the like.

Figure 5:
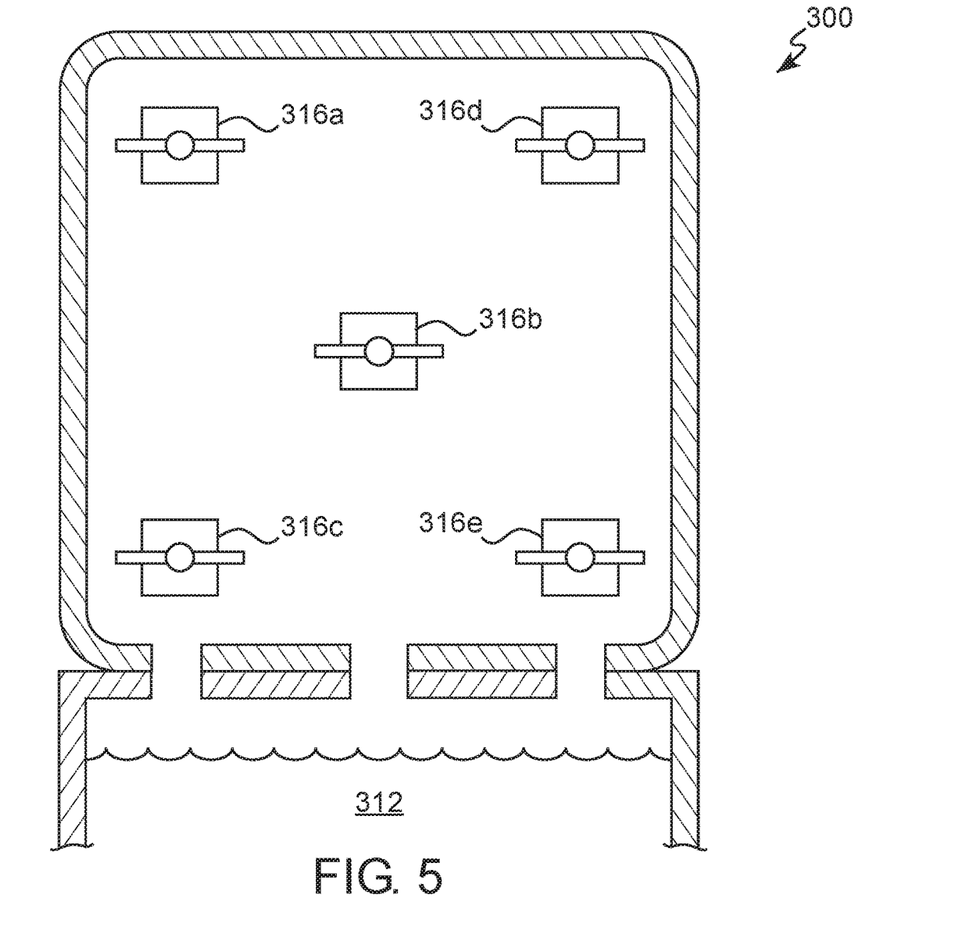
FIG. 5 shows a side view of the hydrogen generating fuel cell of FIG. 3 taken along lines 5-5 thereof.

Referring to FIG. 5, a side view of the fuel cell 300 of FIG. 3 is shown. The fuel cell 300 shown in FIG. 5 includes 5 ultraviolet radiation sources 316a-316e positioned in the illustrated arrangement. It will be appreciated that any number of ultraviolet radiation sources may be used, and they may be positioned in any suitable arrangement. Moreover, in addition to or in lieu of the ultraviolet radiation sources positioned proximate the anode 304 and directed toward the cathode 306, ultraviolet radiation sources may be positioned proximate the cathode 306 and directed toward the anode 304.

Figure 6:
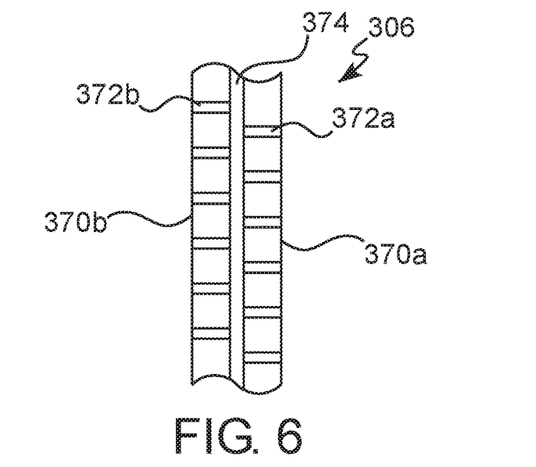
FIG. 6 shows a cross-sectional view of the cathode from the hydrogen generating fuel cell of FIG. 3 taken along lines 6-6 thereof.

Referring to FIG. 6, a cross-sectional view of the cathode 306 from the fuel cell 300 of FIG. 3 is shown, although this could also represent the cross-section of the anode 304. As previously discussed, the electrodes (anodes and cathodes) may be made of a conductive and/or inert metal. The metal may be a porous sheet, which allows the oxygen gas and/or the hydrogen gas to flow therethrough. The electrode may include a plurality of metal sheets 370a, 370b, each defining a plurality of pores 372a, 372b of sufficient size to allow the oxygen gas and/or the hydrogen gas to flow therethrough. A membrane 374 may be positioned between the plurality of metal sheets 370a 370b, as shown in FIG. 6. The membrane 374 may define a plurality of pores. The pores in the membrane 374 may be of sufficient size to allow the oxygen gas and/or the hydrogen gas to flow therethrough, but may be sufficiently small to prevent water molecules (either liquid water or water vapor) from flowing therethrough. The pores of the membrane 374 may have a size of from 50 to 160 picometers (considering the diameter of hydrogen and oxygen ions), but the membrane pores may be any sufficient size to allow the hydrogen and/or oxygen atoms to pass therethrough while preventing water molecules from passing therethrough). The membrane 374 may be a Proton Exchange Membrane (PEM).

Figure 7:
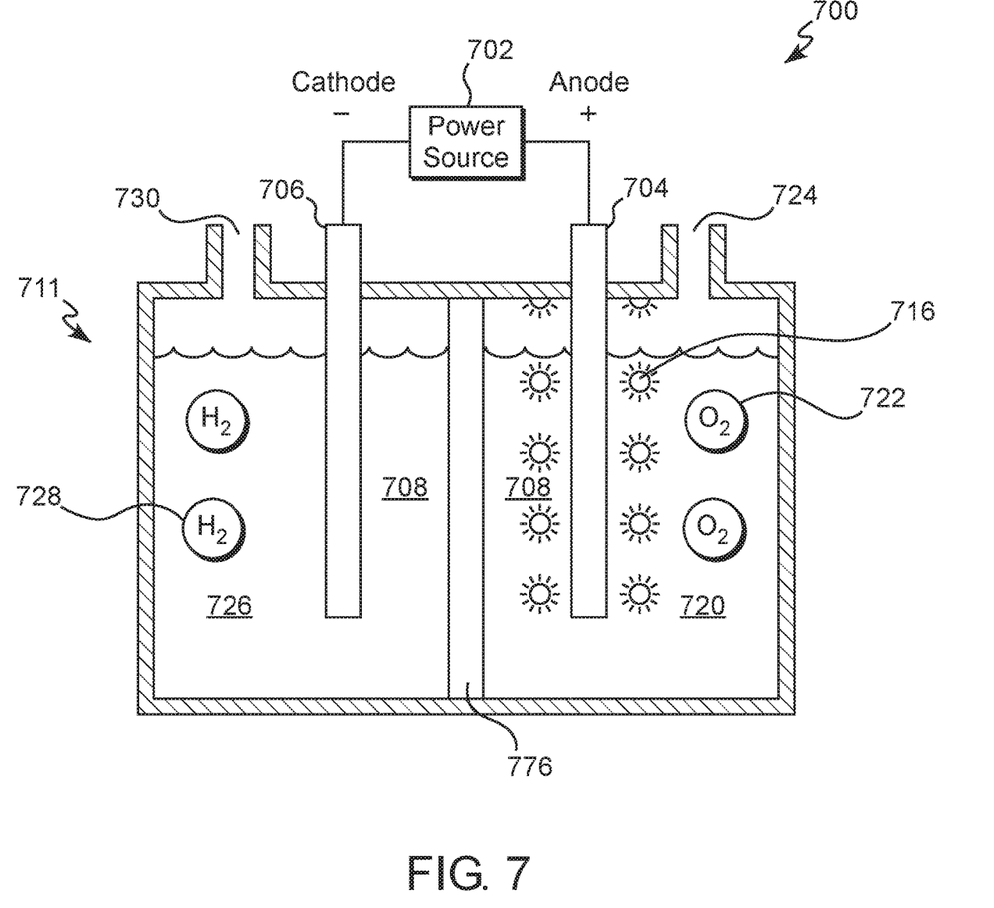
FIG. 7 shows a cross-sectional view of another non-limiting example of a hydrogen generating fuel cell.

Referring to FIG. 7, another non-limiting example of a fuel cell 700 is shown. The fuel cell 700 in FIG. 7 is similar to the one shown and described in FIG. 1, except as hereinafter described. In this non-limiting example, the anode 704 and the cathode 706 may be positioned in a vessel 711 of liquid water (immersed therein), having the channel 708 defined therebetween. The first chamber 720 and the second chamber 726 are on the anode side and cathode side of the vessel 711, respectively. Heat input is not included for this fuel cell 700. A membrane 776 may be positioned in the channel 708 between the anode 704 and the cathode 706. The membrane 776 may be porous, having pores of sufficient size to allow hydrogen and/or oxygen gas to flow therethrough but may be sufficiently small to prevent water molecules (either liquid water or water vapor) from flowing therethrough. The pores of the membrane 776 may have a size of from 50 to 160 picometers (considering the diameter of hydrogen and oxygen ions), but the membrane pores may be any sufficient size to allow the hydrogen or oxygen atoms to pass therethrough while preventing water molecules from passing therethrough). The membrane 376 may be a Proton Exchange Membrane (PEM).

The fuel cell 700 may include ultraviolet radiation sources 716 on the anode side of the membrane 776 and pointed at the cathode side of the membrane 776 (or vice versa or in both directions), and the ultraviolet radiation sources 716 can ionize the water molecules, causing the oxygen molecules to be attracted to the anode side of the membrane 776 and the hydrogen gas to be attracted to the cathode side of the membrane 776. The oxygen gas and hydrogen gas created by the fuel cell 700 may bubble to the surface and escape via outlets 724 and 730, respectively.

Figure 8A:
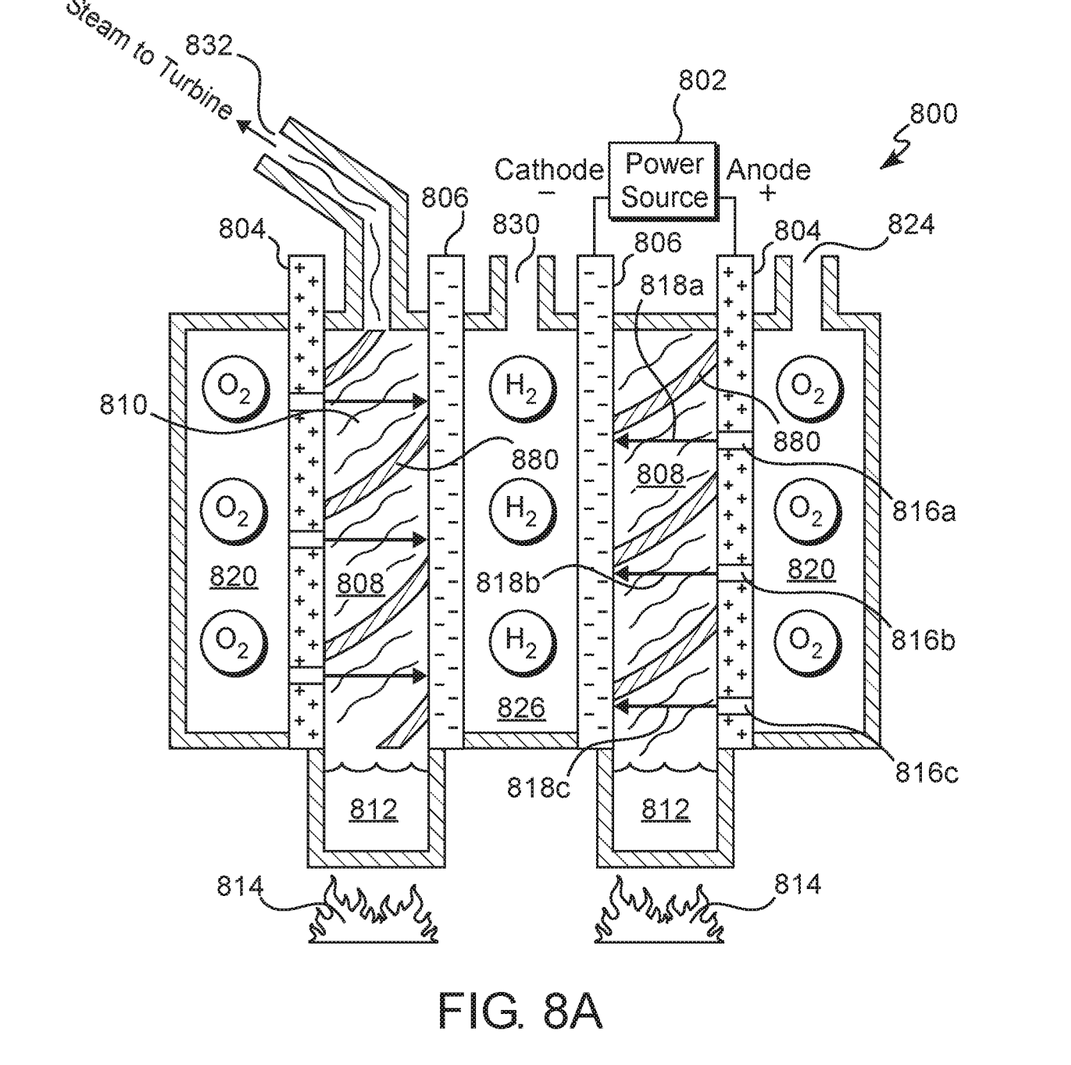
FIG. 8A shows a cross-sectional view of another non-limiting example of a hydrogen generating fuel cell.
Figure 8B:
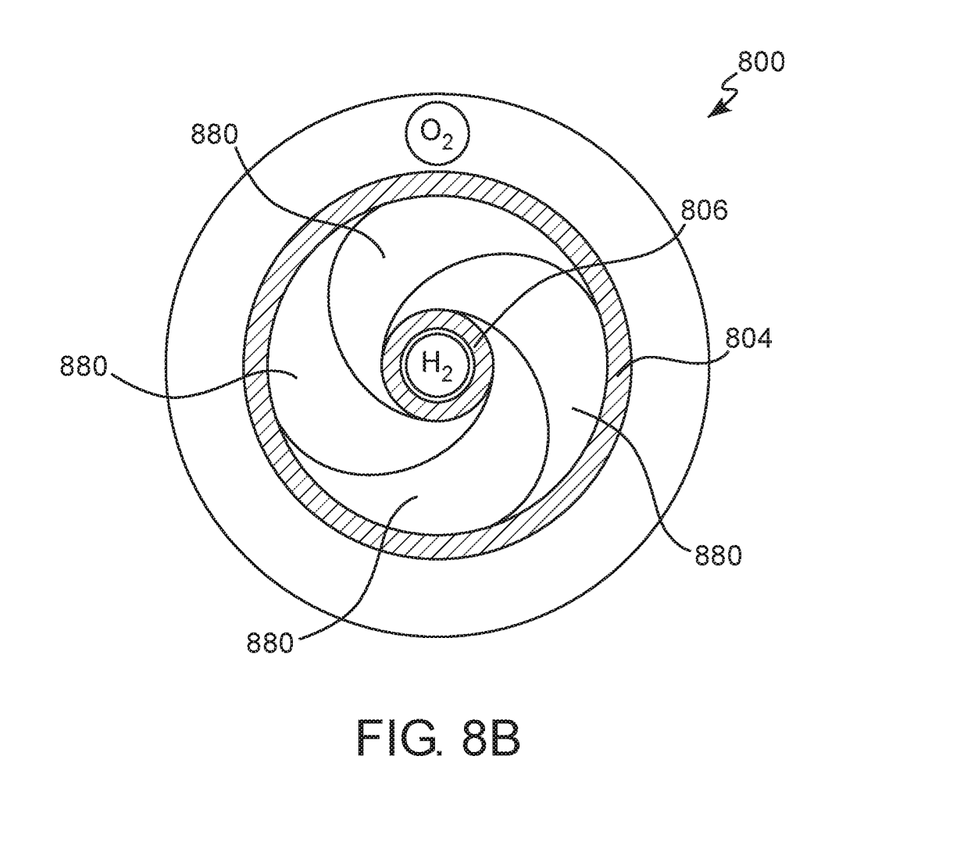
FIG. 8B shows a top cross-sectional view of the channel of the hydrogen generating fuel cell of FIG. 8A, the channel including a spiral arrangement.

Referring to FIGS. 8A and 8B, another non-limiting example of a fuel cell 800 is shown. The fuel cell 800 in FIG. 8 is similar to the one shown and described in FIG. 1, except as hereinafter described. The anode 804 and the cathode 806 may be cylinders comprising vanes 880 to define the channel 808 therebetween. The anode 804 and the cathode 806 may be arranged in a spiral (e.g., vortex or cyclone) configuration to form a spiral channel 808. The spiral channel 808 is configured to create a vortex in the water/water vapor 810 as it rises from the reservoir 812. The vortex induces centrifugal forces in the water/water vapor 810 that help the separation of the split hydrogen gas and oxygen gas by driving the heavier oxygen atoms to the outside while leaving the lighter hydrogen atoms on the inside of the vortex. Thus, the cathode 806 would be included on the inside of the vortex, and the anode 804 would be included on the outside of the vortex.

Referring back to FIGS. 1-8B, any of the fuel cells described herein may be included as a component in a system for generating hydrogen. The system may include a turbine in fluid communication with the channel 208 such that non-ionized liquid water or water vapor leaving the channel 208 may be used to operate the turbine (see e.g., FIG. 2). The system may include a desalinated water tank in fluid communication with the channel 208 such that non-ionized liquid water or water vapor (which has consequentially be desalinated during the process) leaving the channel 208 may be stored therein (see e.g., FIG. 2). The system may include an oxygen storage tank in fluid communication with the anode 204 such that the gaseous oxygen passed through the anode 204 may be stored in the oxygen storage tank (see e.g., FIG. 2). The system may include a hydrogen storage tank in fluid communication with the cathode 206 such that the gaseous hydrogen passed through the cathode 206 may be stored in the hydrogen storage tank (see e.g., FIG. 2). The fuel cells described herein may be powered, at least in part, using renewable resources, as previously discussed. The hydrogen gas, oxygen gas, and water collected by the fuel cells may be used later for energy and water, as needed, contributing to a partial or full renewable energy storage plan.

Figure 9:
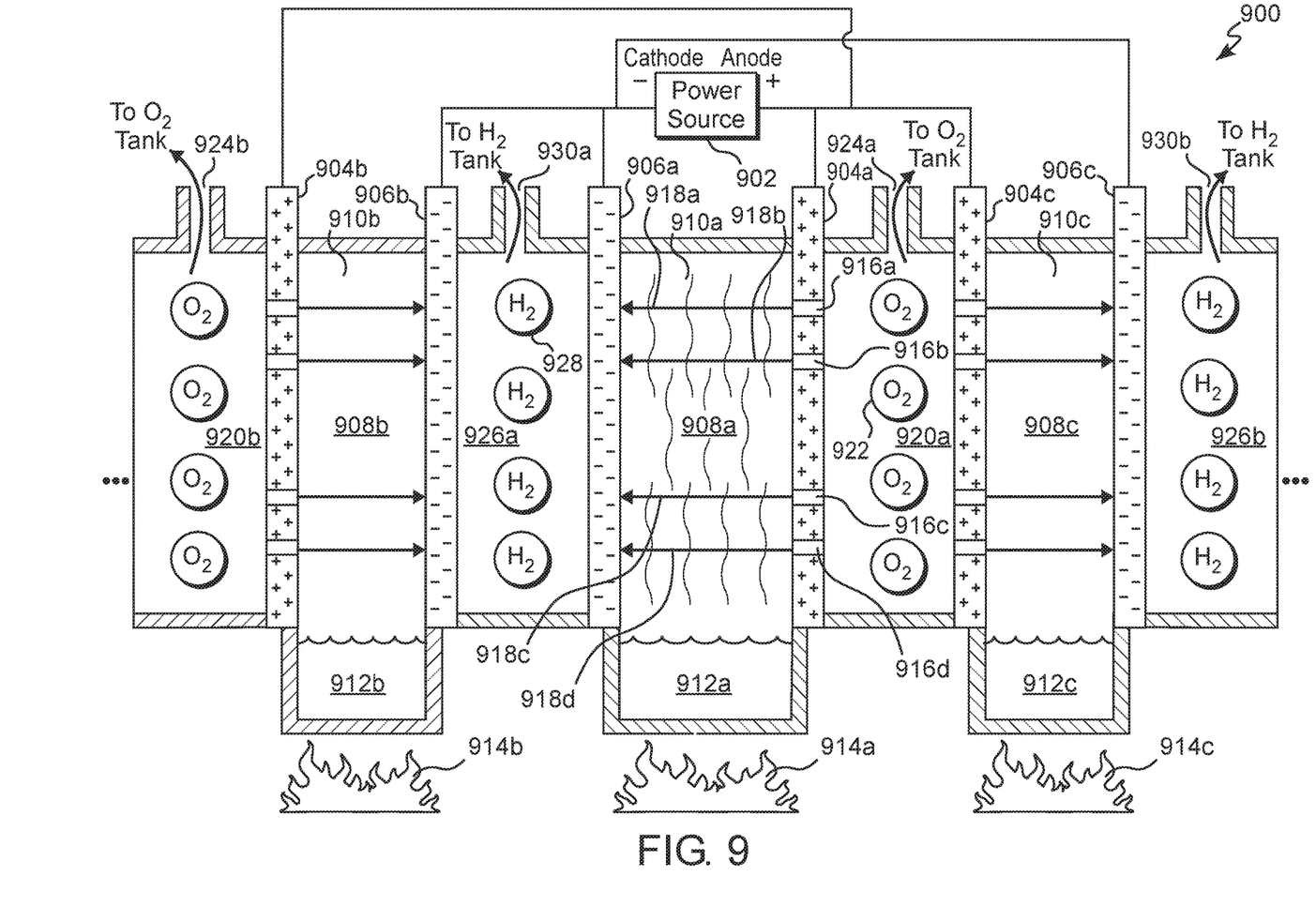
FIG. 9 shows a cross-sectional view of a non-limiting example of a fuel cell stack including a hydrogen generating fuel cell.

With continued reference to FIGS. 1-8B and referring to FIG. 9, any of the fuel cells described herein may be included as a fuel cell in a fuel cell stack comprising a plurality of fuel cells. FIG. 9 shows a non-limiting example of a fuel cell stack 900 including a plurality of fuel cells from FIG. 1. However, it will be appreciated that any of the fuel cells described herein may be arranged together to form a fuel cell stack. The fuel cell stack 900 may include a plurality of anodes 904a-904c and cathodes 906a-906c electrically connected to the power source(s) 902 to operate the fuel cell stack 900. The fuel cell stack 900 may include one or more heat sources 914a-914c to heat one or more reservoirs 912a-912c. A plurality of channels 908a-908c may be defined between the anodes 904a-904c and cathodes 906a-906c in the fuel cell stack 900. Ultraviolet radiation sources 916a-916d may be included in each fuel cell of the fuel cell stack 900 and may ionize the water/water vapor flowing through the respective channels 908a-908c. The produced oxygen gas and hydrogen gas may be stored. The non-ionized water/water vapor may be stored as desalinated water in the case of a salt water reservoir 912a-912c or may be flowed to a turbine to generate power.

Hydrogen may be generated using the following method. Any of the hydrogen generating fuel cells or fuel cell stacks previously described may be provided. Ultraviolet radiation from the ultraviolet radiation source may be emitted from one of the electrodes to the other of the electrodes (anode to cathode or vice versa or in both directions) with the liquid water or water vapor in the channel, such that the emitted ultraviolet radiation causes water molecules to ionize into positive hydrogen atoms and negative oxygen atoms. The hydrogen gas may be isolated, such as by passing through the porous cathode, and collected. The collected hydrogen gas may be used later for energy. The oxygen gas may be isolated, such as by passing through the porous anode, and collected. The non-ionized water may also be isolated and collected as it leaves the channel. The isolated water may be used later as potable or non-potable water. The isolated water may be used to power turbines of a power plant.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A hydrogen generating cell system comprising:
   an anode and a cathode separated by a channel comprising liquid water or water vapor, wherein at least one of the anode and the cathode are porous;
   a power source electrically connected to the anode and the cathode;
   an ultraviolet radiation source positioned to emit ultraviolet radiation from the anode to the cathode, the cathode to the anode, or both directions and through the channel comprising the liquid water or water vapor, wherein the ultraviolet radiation source emits ultraviolet radiation that directly ionizes the liquid water or the water vapor in the channel into hydrogen ions and oxygen ions;
   a membrane associated with the cathode and configured between the anode and the cathode to allow hydrogen gas generated by the emitted ultraviolet radiation to pass therethrough while preventing the liquid water or the water vapor from passing therethrough; and
   a gas chamber suitable for the collection of hydrogen gas positioned adjacent to and in fluid communication with the cathode and comprising hydrogen gas generated by the emitted ultraviolet radiation,
   wherein the cathode induces the migration of the hydrogen ions to generate hydrogen gas, and
   wherein the anode induces the migration of the oxygen ions to generate oxygen gas.

2. The hydrogen generating cell of claim 1, wherein the ultraviolet radiation source is positioned to emit ultraviolet radiation from the anode to the cathode and through the channel comprising the liquid water or water vapor.

3. The hydrogen generating cell of claim 1, further comprising a splitting medium positioned so as to split the emitted ultraviolet radiation into a plurality of rays.

4. The hydrogen generating cell of claim 1, wherein the liquid water or the water vapor comprises one of the group of fresh water, salt water, and wastewater.

5. The hydrogen generating cell of claim 1, further comprising:
a gas chamber suitable for the collection of oxygen gas positioned adjacent to and in fluid communication with the anode and comprising oxygen gas generated by the emitted ultraviolet radiation.

6. The hydrogen generating cell of claim 1, comprising a membrane associated with the anode and configured between the anode and the cathode to allow oxygen gas generated by the emitted ultraviolet radiation to pass therethrough while preventing the liquid water or the water vapor from passing therethrough.

7. The hydrogen generating cell of claim 1, wherein the ultraviolet radiation source comprises an ultraviolet laser or a high intensity ultraviolet radiation source,
wherein the high intensity ultraviolet radiation source comprises a system comprising an ultraviolet lamp in combination with a mirror or lens to intensify or concentrate the ultraviolet radiation.

8. The hydrogen generating cell of claim 1, wherein the anode and the cathode are cylinders comprising vanes to define the channel as a spiral passage for the liquid water or the water vapor.

9. The hydrogen generating cell of claim 1, wherein the ultraviolet radiation source emits ultraviolet radiation having a wavelength from 126 nm to 193 nm.

10. The hydrogen generating cell of claim 1, wherein the channel comprises water vapor.

11. The hydrogen generating cell of claim 1, wherein the ultraviolet radiation emitted by the ultraviolet radiation source in combination with electrical energy from the power source creates a low temperature plasma field.

12. A hydrogen generating system comprising:
a hydrogen generating cell comprising:
an anode and a cathode separated by a channel comprising liquid water or water vapor, wherein at least one of the anode and the cathode are porous;
a power source electrically connected to the anode and the cathode;
an ultraviolet radiation source positioned to emit ultraviolet radiation from the anode to the cathode, the cathode to the anode, or both directions and through the channel comprising the liquid water or water vapor, wherein the ultraviolet radiation source emits ultraviolet radiation that directly ionizes the liquid water or the water vapor in the channel into hydrogen ions and oxygen ions;
a membrane associated with the cathode and configured between the anode and the cathode to allow hydrogen gas generated by the emitted ultraviolet radiation to pass therethrough while preventing the liquid water or the water vapor from passing therethrough; and
a gas chamber suitable for the collection of hydrogen gas positioned adjacent to and in fluid communication with the cathode and comprising the hydrogen gas generated by the emitted ultraviolet radiation,
wherein the cathode induces the migration of the hydrogen ions to generate hydrogen gas, and
wherein the anode induces the migration of the oxygen ions to generate oxygen gas.

13. The hydrogen generating system of claim 12, further comprising:
a turbine in fluid communication with the channel such that non-ionized liquid water or water vapor leaving the channel operates the turbine.

14. The hydrogen generating system of claim 12, further comprising:
a tank in fluid communication with the channel, the tank storing non-ionized liquid water or water vapor leaving the channel.

15. The hydrogen generating system of claim 12, further comprising:
a tank suitable for the collection of oxygen gas in fluid communication with the anode, the tank storing gaseous oxygen passing through the anode.

16. The hydrogen generating system of claim 12, further comprising:
a tank suitable for the collection of hydrogen gas in fluid communication with the gas chamber such that the gaseous hydrogen passing through the gas chamber is stored in the tank.

17. The hydrogen generating system of claim 12, further comprising a plurality of the hydrogen generating cells in a stacked arrangement to form a cell stack.

18. A method of generating hydrogen comprising:
providing a hydrogen generating cell comprising:
an anode and a cathode separated by a channel comprising liquid water or water vapor, wherein at least one of the anode and the cathode are porous;
a power source electrically connected to the anode and the cathode;
an ultraviolet radiation source positioned to emit ultraviolet radiation from the anode to the cathode, the cathode to the anode, or both directions and through the channel comprising the liquid water or water vapor, wherein the ultraviolet radiation source emits ultraviolet radiation that directly ionizes the liquid water or the water vapor in the channel into hydrogen ions and oxygen ions;
a membrane associated with the cathode and configured between the anode and the cathode to allow hydrogen gas generated by the emitted ultraviolet radiation to pass therethrough while preventing the liquid water or the water vapor from passing therethrough; and
a gas chamber suitable for the collection of hydrogen gas positioned adjacent to and in fluid communication with the cathode comprising the hydrogen gas generated by the emitted ultraviolet radiation,
wherein the cathode induces the migration of the hydrogen ions to generate hydrogen gas, and
wherein the anode induces the migration of the oxygen ions to generate oxygen gas; and
emitting the ultraviolet radiation from the anode to the cathode, the cathode to the anode, or both directions and through the channel comprising the liquid water or water vapor to directly ionize the liquid water or the water vapor in the channel into hydrogen ions and oxygen ions.

19. The method of claim 18, further comprising:
collecting hydrogen gas generated by the ultraviolet radiation and passing through the cathode.

20. The method of claim 18, further comprising:
collecting oxygen gas generated by the ultraviolet radiation and passing through the anode.

21. The method of claim 18, further comprising:
   collecting non-ionized liquid water or water vapor leaving the channel.

\* \* \* \* \*